United States Patent Office 3,347,814
Patented Oct. 17, 1967

3,347,814
FREEZE-THAW STABLE AQUEOUS POLYMER DISPERSION CONTAINING A WATER-MISCIBLE AMIDE
Robert J. Hatala, St. Petersburg, Fla., assignor to E. I. du Pont de Nemours and Company, Wilmington, Del., a corporation of Delaware
No Drawing. Filed Aug. 6, 1964, Ser. No. 387,987
10 Claims. (Cl. 260—29.6)

This invention relates to aqueous paint vehicles and paints and particularly to aqueous paint vehicles having additives therein which improve the freeze-thaw stability of the vehicles and paints.

Ethylene glycol and glycerol have generally been utilized in the prior art as stabilizing agents for aqueous dispersions of polymers. Some of the difficulties which are encountered with such dispersions are extended drying times, decreased adhesion of the resulting film to the substrate and increased water sensitivity of the resulting film.

It has now been discovered that a composition consisting essentially of an aqueous dispersion of a water-insoluble vinyl addition polymer and a water-miscible amide, said amide having a dielectric constant above about 80, a molecular weight up to about 500 and being in an amount of about 0.1% to about 5% by weight of polymer weight, is freeze-thaw tolerant, fast-drying and forms water-resistant films having excellent adhesion to substrates.

These aqueous dispersions are useful in forming protective clear coatings on metal, cellulosic materials and other substrates. Pigments can be added to the dispersions to add decorative colors to the protective coatings. Other additives can also be added to obtain special properties for unusual applications.

Aqueous dispersions of iminated polymers, which dispersions also contain an amide having the properties disclosed above, can be used to form a surface coating for poromeric materials in addition to being useful in forming protective coatings on metal, cellulosic materials or other substrates. Imination is accomplished by reacting a dispersion of a polymer containing pendant carboxyl groups with an aqueous solution of an alkylidenimine, such as propylenimine. A suitable procedure is disclosed in U.S. patent application Serial No. 258,605, filed by John A. Simms on Feb. 4, 1963.

The compositions of this invention have improved freeze-thaw tolerance regardless of whether ionogenic or non-ionogenic polymers are utilized and without adverse effect on other dispersion properties. These polymers can be any vinyl addition polymers, but preferably are acrylic polymers, suitable for use in coating compositions, such as paints, lacquers and the like and can be homopolymers or copolymers or mixtures thereof. Typical dispersions of ionogenic polymers useful in this invention are described in U.S. Patents 2,787,561; 2,787,563; 2,866,763; 2,918,391; 2,795,564; 3,032,521 and 3,069,375. The disclosures of these patents are hereby incorporated into this specification. These dispersions are more fully described as:

(I) Dispersions of polymers of (A) units of acrylonitrile, (B) units of an alpha-olefinic monocarboxylic acid (C) units of an ester of said alpha-olefinic monocarboxylic acid with a saturated aliphatic alcohol of 1 to 8 carbon atoms and (D) units of a polymerizable glycidol derivative, and blends of this dispersion with dilutable heat-reactive condensation resins as described in U.S. Patent 2,787,561;

(II) Dispersions of polymers of (A) units of acrylonitrile, (B) units of an alpha-olefinic monocarboxylic acid and (C) units of an ester of said alpha-olefinic monocarboxylic acid with a saturated aliphatic alcohol of 1 to 8 carbon atoms, and blends of this dispersion with water-dilutable heat-reactive condensation resins as described in U.S. Patent 2,787,563;

(III) Dispersions of polymers of ammonium salts of polymers of (A) acrylonitrile, (B) units of an alpha-olefinic monocarboxylic acid and (C) units of an aliphatic ester of the (B) acid in which the aliphatic group contains from 1 to 12 carbon atoms, and blends of this dispersion with water-dilutable heat-reactive condensation resins as described in U.S. Patent 2,866,763;

(IV) Dispersions of polymers of (A) units of monofunctional polymerizable vinylbenzene monomer, (B) units of an alpha-olefinic monocarboxylic acid and (C) units of an ester of said alpha-olefinic acid with a saturated aliphatic alcohol of 1 to 8 carbon atoms plus a water-dilutable heat-reactive condensation resin of formaldehyde and at least one phenol, urea or melamine as described in U.S. Patent 2,918,391. A dispersion which is also useable with the amides of this invention can be prepared from the (A), (B) and (C) monomers of U.S. Patent 2,918,391 without the addition of the water-dilutable resin;

(V) Dispersions of polymers of (A) units of a polymerizable compound which by itself forms hard homopolymers, (B) units of a polymerizable compound preferably an exter, which by itself forms soft homopolymers and (C) units of an alpha-olefinic monocarboxylic acid as described in U.S. Patent 2,795,564;

(VI) Dispersions of polymers of (A) units of acrylonitrile, (B) units of an alpha-olefinic monocarboxylic acid, such as acrylic acid, methacrylic acid, ethacrylic acid, phenyl acrylic acid, and crotonic acrylic acid, and (C) units of an ester of at least one of said acids with a saturated aliphatic monohydric alcohol of 1 to 8 carbon atoms which also contain water soluble coalescing agents as described in U.S. Patent 3,032,521; and (VII) Dispersions of polymers of (A) units of a monoethylenically unsaturated monocarboxylic acid, (B) units of at least one ester of a saturated monohydric alcohol and a monoethylenically unsaturated monocarboxylic acid having an alpha bound terminal methylene group and (C) units of at least one nitrile of a monoethylenically unsaturated monocarboxylic acid having an alpha bound terminal methylene group as described in U.S. Patent 3,069,375.

Typical dispersions of non-ionogenic or neutral polymers useful in the dispersions of this invention include polymers of vinyl compounds, such as vinyl acetate, vinyl chloride, vinyl-vinylidene chloride, and vinylidene chloride; hydrocarbon polymers and copolymers, such as polyethylene, polypropylene, polybutadiene, butadiene-styrene, polystyrene, butadiene-vinyl toluene, isoprene-styrene, oxygenated polyisoprene and oxygenated polybutadiene-polyisoprene; alkyd resins and modified alkyd resins; vinyl acetate-acrylic acid and acrylic ester copolymers and polymers of other acrylic monomer mixtures; cellulosics, such as ethylcellulose and cellulose acetate; urea-formaldehyde resins; polyamides (nylons); urethanes, and combinations of these.

Typical dispersions including the above non-ionogenic polymers, which are useful in forming the dispersions of this invention, and method of preparation and compounding them with stabilizers, pigments, and other additives are described in U.S. Patents 2,498,712; 2,728,737; 2,731,434; 2,731,435; 2,739,136; 2,773,849; 2,807,597; 2,809,950; 2,833,737; 2,837,444; 2,852,475; 2,852,476; 2,868,752; 2,875,166; 2,881,143; 2,883,355; 2,884,397; 2,886,546; 2,887,460; 2,888,421; 2,888,422; 2,888,505; 2,889,236; 2,889,314; 2,892,802; 2,894,927; 2,895,930; 2,897,100; 2,897,165; 2,899,397; 2,905,649; 2,907,720;

2,902,721; 2,904,523; 2,912,399; 2,913,429; 2,914,497; 2,917,476; 2,291,046; 2,922,781; 2,933,467; 2,933,469; 2,934,529; 2,936,295 and 2,937,156.

The useful proportions of polymer to aqueous medium in the dispersions of this invention are the same as those described in the above patents and generally range as high as 3:1 and as low as 1:10. Best freeze-thaw tolerance and most useful application properties, such as dispersion viscosity and covering power, are obtained when the quantity of polymers is about 30% to 55% by weight of total dispersion weight. Best dispersion freeze-thaw tolerance, drying rate, film adhesion and film water resistance is obtained with amide quantities of 1% to 2% based on polymer weight.

Amides useable in the dispersions of this invention must be miscible with or soluble in the aqueous medium of these dispersions, at least for the small amide quantities used. The preferred amides for use in the dispersions of this invention are formamide, N-methyl formamide, N-methyl acetamide and N-methyl propionamide which have dielectric constants ranging from about 109 to about 190 and molecular weights up to 87. Amides having lower dielectric constants down to about 80 and amides having higher dielectric constants are also useful, while molecular weights can vary up to about 500 as previously disclosed. The dielectric constants of the amides of this invention are measured by ordinary capacitance bridge methods at a temperature of 20° C. and a frequency of $10^4$ cycles per second.

The freeze-thaw stability of aqueous dispersions of this invention is determined by subjecting the dispersion to a cycle of 16 hours at −10° C. followed by 8 hours at +25° C. The number of these cycles which a dispersion at a specified pH will endure without coagulating is determinative of its freeze-thaw stability at that pH.

The dispersions of this invention are prepared by first preparing the polymer dispersion by conventional methods (i.e., according to the procedure disclosed in one of the above mentioned patents) and then adding the amide by an ordinary mixing operation. Generally, these polymer dispersions are prepared by mixing the monomers in an aqueous medium which contains a polymerization catalyst such as sodium bisulfite. A redox polymerization initiator system can be established to speed the polymerization reaction by the use of small amounts of persulfate initiators.

Small amounts of surface active agents are added during preparation of the polymer as dispersing agents to prevent coagulation during early stages of the reaction and to impart stability to the final dispersion. A wide variety of surface active agents including anionic and non-ionic organic agents as well as inorganic dispersing agents are used. For example, dispersions numbered I through III above use an anionic surfactant, such as sodium lauryl sulfate, in quantities ranging from about 0.2% to about 4% based on the weight of monomers, dispersions IV and VI utilize either anionic surfactants, such as sodium lauryl sulfate, or non-ionic surfactants, such as polyoxyethylene-polyoxypropylene mixtures, dispersion V uses non-ionic surfactants, such as octylphenoxypolyethoxyethanol in amounts ranging from 2% to 12% by weight based on the weight of monomers, and dispersion VII utilizes stabilized colloidal silica as the dispersing agent. The same or similar dispersing agents can be used in preparing the dispersions of non-ionogenic polymers when necessary as disclosed in the above patents.

Any of the ordinary water insoluble inorganic and organic paint pigments can be used with the above dispersions. Titanium dioxide is preferred as a white pigment. Other useful white pigments include zinc oxide, leaded zinc oxide, zinc sulfide, lead titanate, antimony oxide, zirconium oxide, white lead, etc. Useful colored pigments include carbon black, the various iron oxides, lead chromates, chrome yellow, chrome orange, molybdate orange, chrome green, phthalocyanine blues and greens, etc. Extenders, such as clay, silica, talc, mica, calcium carbonate, calcium silicate or barium sulfate, can also be incorporated.

The quantity of pigment which can be added to the dispersions of this invention depends on the type of coating desired. Clear coatings can be made from dispersions of the polymer alone. The gloss of a paint is generally inversely proportional to pigment volume concentrations, but is also dependent on pigment particle size. Sealers and special coatings use high pigment volume concentrations. Pigments can be added either by grinding them directly into the dispersion in a colloid mill, or by preparing a paste of the pigment in water with the aid of a dispersing agent and combining this pigment dispersion with the polymer dispersion. Such pastes are readily prepared by combining pigment, dispersing agent and water and grinding the mixture on any of the commonly used mills.

Various auxiliary agents which are normally used in aqueous base paints can also be added to the dispersions of this invention, including bodying agents, such as methyl cellulose, defoaming agents, such as waxes, humectants, such as water soluble gums and bactericides or fungicides, such as borax.

EXAMPLE 1

A monomer mix is prepared by combining under nitrogen 31 parts by weight of methyl methacrylate, 65 parts by weight of 2-ethylhexyl acrylate and 4 parts by weight of methacrylic acid.

About 200 parts by weight of deionized water is charged into a polymerization vessel equipped with stirrer, reflux column, thermometer and inert gas inlet. Nitrogen or other inert gas is introduced, stirring is started, and the water is refluxed for about 15 minutes to remove oxygen. The water is then cooled to about 150° F. and about 0.5 part of sodium lauryl sulfate and 5 cubic centimeters of a 5% solution of sodium bisulfite in deoxygenated water added.

The monomer mix is then added followed by the addition of 10 cubic centimeters of a 10% solution of ammonium persulfate in deoxygenated water. The resulting mixture is held at a temperature of about 140° F. for about 2 hours or until the polymerization reaction is complete. The polymerization reaction can be conducted at a temperature ranging from room temperature up to reflux temperature of the mixture. The resulting dispersion is cooled and blown with air to remove residual monomers.

The pH of the dispersion is adjusted to about 9 with ammonium hydroxide and 3 parts by weight of formamide (dielectric constant of 109) is added. The resulting dispersion survived 5 freeze-thaw cycles without coagulating while a control sample of the dispersion without the amide failed to survive one freeze-thaw cycle. The drying time, film water sensitivity and film adhesion to cellulosic and metal substrates of the amide containing dispersion remained substantially equal to the control.

N-methyl acetamide (dielectric constant of 165.5), N-methyl formamide (dielectric constant of 182.4) and N-methyl propionamide (dielectric constant of about 190) were substituted for formamide in the above dispersion with similar results. Pigments were added to these dispersions to produce useful paints having an exceptionally high degree of freeze-thaw tolerance.

EXAMPLE 2

A surface finish for poromeric materials was prepared by the following procedure.

First, a carboxylic polymer dispersion is prepared in accordance with Example 3 of U.S. Patent 2,795,564. The polymer was a 37:61·5:1·5 terpolymer of methyl methacrylate:ethyl acrylate:methacrylic acid. The solids content of this dispersion is adjusted to 42% and 100 parts of the dispersion is charged to a reactive vessel equipped with stirrer, thermometer, condenser and addition funnel. A freshly made 33% aqueous solution of propylenimine was gradually added with stirring at 25° C. in an amount sufficient to esterify about 50% of the pendant carboxyl groups of the polymer. When this addition is complete, the temperature of the mixture is slowly raised to about 58° C. over a period of 30 minutes and is held at this temperature for an additional 30 minutes.

The resulting amino-ester polymer dispersion is cooled to 25° C. and filtered through cheesecloth to remove any coarse coagulum that has formed. About one part of formamide is slowly added. The freeze-thaw tolerance of the resulting dispersion represents a several fold improvement over a control sample which does not certain the amide while the dispersion drying time, film adhesion and film resistance to water are comparable.

By adding dyes and pigments to this dispersion, the resulting composition is useful as a finish coating for poromeric material.

What is claimed is:

1. A stable freeze-thaw tolerant film-forming composition consisting essentially of an aqueous dispersion of a water-insoluble vinyl addition polymer and a water-miscible amide, said amide selected from the group consisting of formamide, N-methyl formamide, N-methyl acetamide and N-methyl propionamide, and said amide being in an amount of about 0.1 to about 5% based on polymer weight.

2. The composition of claim 1 in which the polymer is an acrylic polymer.

3. The composition of claim 1 in which the polymer is ionogenic.

4. The composition of claim 3 in which the polymer consists essentially of (A) units of a polymerizable compound which forms hard homopolymers, (B) units of a polymerizable compound which forms soft homopolymers and (C) units of an alpha-olefinic monocarboxylic acid.

5. The composition of claim 4 in which the polymer consists essentially of (A) units of methyl methacrylate, (B) units of 2-ethylhexyl acrylate and (C) units of methacrylic acid.

6. The composition of claim 5 in which the quantity of the amide is from 1% to 2% by weight of the polymer weight.

7. The composition of claim 6 in which the quantity of the polymer is from 30% to 50% by weight of the aqueous dispersion weight.

8. The composition of claim 7 which also contains a pigment.

9. The composition of claim 1 in which the quantity of said water-miscible amide is from 1% to 2% by weight of polymer weight.

10. The composition of claim 1 which also contains a pigment.

References Cited

UNITED STATES PATENTS

| 2,683,699 | 7/1954 | Gehring | 260—29.7 |
| 2,758,982 | 8/1956 | Wicklatz et al. | 260—45.9 |

FOREIGN PATENTS 732,480  6/1955  Great Britain.

SAMUEL H. BLECH, *Primary Examiner.*

MURRAY TILLMAN, GEORGE F. LESMES, *Examiners.*

W. J. BRIGGS, SR., *Assistant Examiner.*